United States Patent
Coffin, III (10) Patent No.: US 7,072,627 B2
(45) Date of Patent: Jul. 4, 2006

(54) METHOD AND APPARATUS FOR ADJUSTING SIGNAL COMPONENT STRENGTH

(75) Inventor: Louis F. Coffin, III, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 381 days.

(21) Appl. No.: 10/184,819

(22) Filed: Jun. 27, 2002

(65) Prior Publication Data

US 2004/0203425 A1    Oct. 14, 2004

(51) Int. Cl.
*H04B 17/02* (2006.01)

(52) U.S. Cl. .................. 455/137; 455/133; 455/134; 455/135; 455/136; 455/138; 455/272; 455/273; 455/278.1; 455/3.01; 455/3.02; 455/12.1; 455/13.1

(58) Field of Classification Search .......... 455/133, 455/134, 135, 136, 137, 138, 272, 273, 278.1, 455/279.1, 3.01, 3.02, 12.1, 13.1
See application file for complete search history.

(56) References Cited

U.S. PATENT DOCUMENTS

| | | | | |
|---|---|---|---|---|
| 4,742,563 | A | * 5/1988 | Fukumura | .......... 455/132 |
| 5,797,083 | A | 8/1998 | Anderson | |
| 2002/0172374 | A1* | 11/2002 | Bizjak | .......... 381/71.14 |
| 2003/0190902 | A1* | 10/2003 | Horie et al. | .......... 455/272 |

FOREIGN PATENT DOCUMENTS

| | | | |
|---|---|---|---|
| JP | 63-073711 | * | 4/1988 |
| JP | 10336069 | | 12/1998 |

OTHER PUBLICATIONS

Loosvelt, et al; "Performance of an OFDM-SDMA based System in a Time-Varying Multi-Path Channel"; 0-7803-7005-8/01; 2001 IEEE; pp. 1686-1690.

Smith, et al; "A Multi-Channel Pulse-Coded Multiplexing and Demodulating Telemetry System"; IEEE Transactions on Bio-Medical Engineering, vol. BME-17, No. 2; Apr. 1970; pp. 151-156.

Noneaker, et al; "The Effect of Automatic Gain Control on Serial, Matched-Filter Acquisition in Direct-Sequence Packet Radio Communications"; IEEE Transactions on Vehiclular Technology, vol. 50; No. 4; Jul. 2001; pp. 1140-1150.

Kim, et al; "Design and Analysis of an Automatic Gain Control Scheme for High-Speed Satellite Communications"; IEICE Trans. Commun., vol. E83-B, No. 1; Jan. 2000; pp. 99-102.

(Continued)

*Primary Examiner*—Doris H. To
*Assistant Examiner*—Sanh Phu
(74) *Attorney, Agent, or Firm*—Lee & Hayes, PLLC (57) ABSTRACT

A first signal component is received having a first signal strength and a second signal component is received having a second signal strength. A difference is identified between the first signal strength and the second signal strength. A determination is made as to whether the difference between the first signal strength and the second signal strength exceeds a threshold. If the difference between the first signal strength and the second signal strength exceeds a threshold, the first signal strength is adjusted to reduce the difference between the first signal strength and the second signal strength.

41 Claims, 7 Drawing Sheets

OTHER PUBLICATIONS

Abbott, Liston; "Cancellation of Visible Color Crosstalk Between Two TV Signals By Use of Alternate Line Delay"; RCE Review; vol. 41; Sep. 1980; pp. 349-363.

Rozov et al.; "Influence of AGC on crosstalk noise level in multichannel SW systems"; USSR, Apr. 1973, vol. 27, No. 4, pp. 60-4.

* cited by examiner

METHOD AND APPARATUS FOR ADJUSTING SIGNAL COMPONENT STRENGTH

TECHNICAL FIELD

This invention relates to signal processing and, in particular, to systems and methods that adjust the signal strength of one or more signal components.

BACKGROUND

In broadcast environments, such as a satellite broadcast environment, data signals are typically received by an antenna, dish, or other signal receiving mechanism. A transponder is a frequency band or channel of a broadcast signal. Satellites transmit data using multiple transponders (or channels), such as thirty-two transponders. The multiple transponders are divided into a left hand polarity and a right hand polarity such that sixteen transponders each include the two polarities.

The received signals are initially processed by a first unit which includes a receiving antenna or dish, and a Low Noise Block Feed component (LNBF). This first unit may also be referred to as an "outdoor unit" or as an "outdoor tuning device". The receiving antenna or dish focuses the two polarities of a transmitted satellite signal to the LNBF. The LNBF amplifies the weak satellite signal and converts the signal from the KU band (approximately 12 GHz) to the L band (approximately 1.5 GHz) so that the signal can be processed with conventional electronic processing components. The LNBF also separates the two polarities of the satellite signal. This first unit transmits the signal to a second device, such as an Integrated Receiver Decoder (IRD) connected to a television, an audio/video system, or similar device. This second device may also be referred to as an "indoor receiver".

In a conventional satellite receiver system, the IRD (or indoor unit) places a direct current (DC) power on the coaxial cable that connects the IRD and the outdoor unit. This is used to power the LNBF and to signal the LNBF as to which polarity is to be placed on the coaxial cable. The DC power can be switched by the IRD between, for example, thirteen volts and eighteen volts to identify the appropriate polarity.

The IRD has a tuning device that can tune to one of the sixteen transponders and retrieve the associated data from the signal. The data may contain information for up to ten television shows and include both audio information and video information. Specific selection of a television show is performed with logic or by computer programs that can, for example, select the audio/video data packets for a particular television show.

Each tuner of the IRD tuning device can tune to one transponder of one polarity from one satellite. If a particular system has multiple tuners, then multiple transponders received from one or more satellites can be tuned simultaneously. Conventional systems use separate communication links, such as separate coaxial cables or other conductors, to communicate signals to multiple tuners. For example, in a system with four tuners, four coaxial cables are run in parallel between the LNBF and the IRD.

Attempts to transmit multiple transponders that may be of separate polarity or received from multiple satellites across a common communication link are likely to result in crosstalk and/or other signal corruption between the multiple transponders. The crosstalk and/or other signal corruption is caused when transmitting signals having different strengths via the same communication link. One or more stronger transponders (or signal components) will dominate the weaker transponders. Thus, to communicate multiple transponders between two devices, a conventional system must operate with the signal corruption problems or implement separate communication links for signals associated with each transponder.

Accordingly, there is a need for systems and methods that adjust the signal strength of one or more signal components to reduce crosstalk and other signal corruption between the signal components.

SUMMARY

The systems and methods described herein receive and process multiple signals by adjusting the strength of one or more signal components if the difference between signal strengths exceeds a threshold. After making any necessary signal strength adjustments, the signals are transmitted to a receiving device across a common communication link. The signal strengths of the one or more signal components are adjusted to reduce the difference in signal strengths, thereby reducing the amount of crosstalk or other signal corruption between two or more signal components when transmitted across the communication link.

In one embodiment, a first signal component is received having an associated first signal strength. A second signal component having an associated second signal strength is also received. A difference is identified between the first signal strength and the second signal strength, and a determination is made as to whether the difference between the first signal strength and the second signal strength exceeds a threshold. If the difference between the first signal strength and the second signal strength exceeds the threshold, the first signal strength is adjusted to reduce the difference between the first signal strength and the second signal strength.

In another embodiment, a signal component is received having an associated signal strength. A desired range of signal strengths is identified and a determination is made as to whether the signal strength of the received signal component is within the desired range of signal strengths. If the signal strength of the received signal component is outside the desired range of signal strengths, the signal strength of the received signal component is adjusted such that the signal strength is within the desired range of signal strengths.

In a particular embodiment, an outdoor tuning device is coupled to receive at least one satellite signal from a satellite receiving antenna. The outdoor tuning device is capable of adjusting a signal strength associated with the received satellite signal. An indoor receiver is coupled to receive signals from the outdoor tuning device. The indoor receiver is capable of instructing the outdoor tuning device regarding adjusting the signal strength associated with the received satellite signal.

BRIEF DESCRIPTION OF THE DRAWINGS

The same numbers are used throughout the drawings to reference like features and components.

DETAILED DESCRIPTION

The systems and methods described herein allow multiple signal components to be transmitted across a single communication link with reduced crosstalk between one or more of the signal components, and with reduced signal component corruption. The systems described herein contain one or more tuning elements coupled to a Low Noise Block Feed component (LNBF). These tuning elements, and associated switch matrices, position transponders (or signal components) of any polarity and/or from different satellites next to each other on the same communication cable. The signal strength associated with each transponder can be adjusted before the multiple signal components are combined for transmission across the single communication link.

Figure 1:
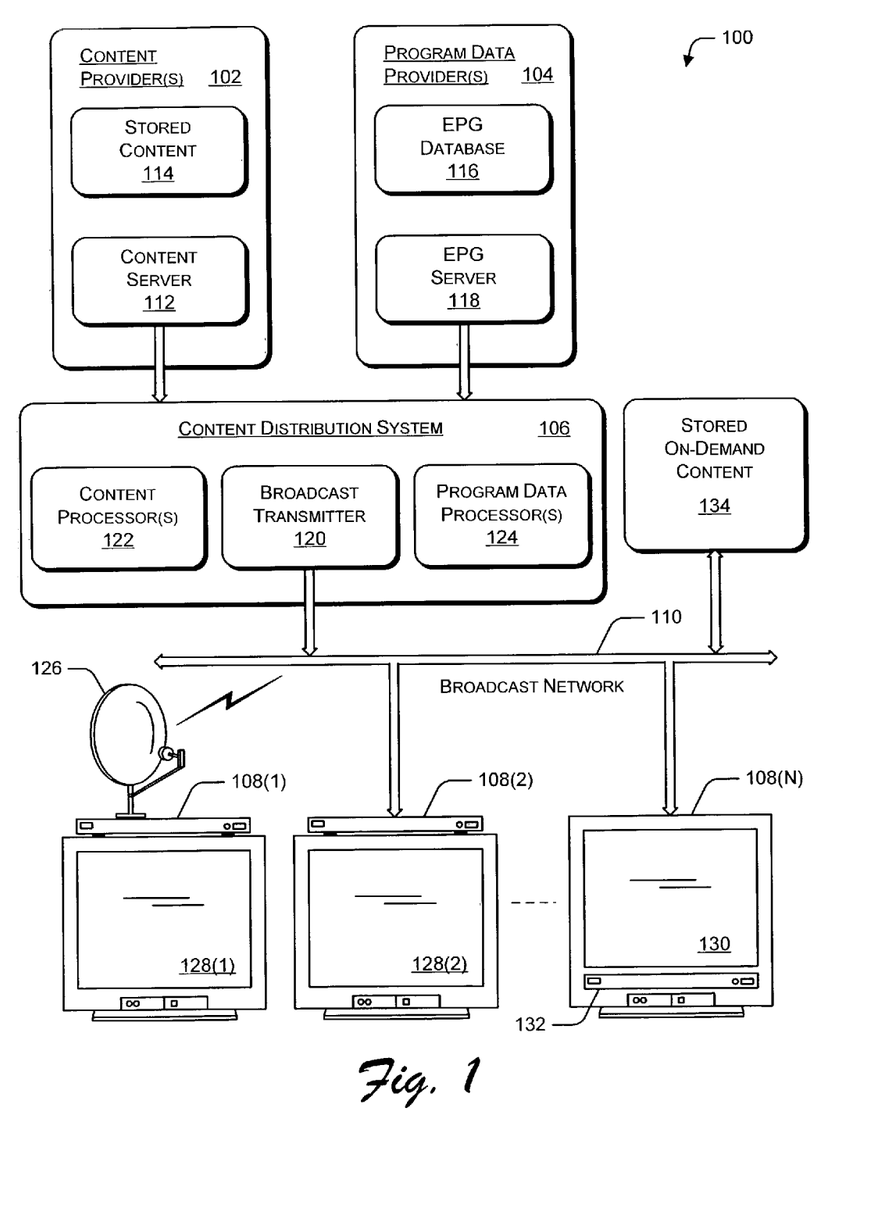
FIG. 1 illustrates an exemplary environment in which the systems and methods for adjusting signal component strength as described herein may be implemented.

FIG. 1 illustrates an exemplary television entertainment system 100 that is an architecture in which the methods and systems for adjusting signal component strength can be implemented. System 100 facilitates distribution of content and program data to multiple viewers, and includes components to facilitate adjusting signal component strength. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106. Program data provider 104 includes an electronic program guide (EPG) database 116 and an EPG server 118. The EPG database 116 stores electronic files of program data (or, "EPG data") which is used to generate an electronic program guide (or, "program guide"). Program data includes program titles, ratings, characters, descriptions, actor names, station identifiers, channel identifiers, schedule information, and so on.

The EPG server 118 processes the program data prior to distribution to generate a published version of the program data which contains programming information for all channels for one or more days. The processing may involve any number of techniques to reduce, modify, or enhance the program data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet or Intranet). Further, the published version of the program data can be transmitted from program data provider 104 via a satellite and the content distribution system 106 directly to a client device 108.

Content distribution system 106 includes a broadcast transmitter 120, one or more content processors 122, and one or more program data processors 124. Broadcast transmitter 120 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processor 122 can be implemented as an application program to process the content received from content provider 102 prior to transmitting the content across broadcast network 110. Similarly, a program data processor 124 can be implemented as an application program to process the program data received from program data provider 104 prior to transmitting the program data across broadcast network 110. A particular content processor 130 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

A client device 108 can be implemented as a set-top box, a satellite receiver, a TV recorder with a hard disk, a digital video recorder (DVR) and playback system, a personal video recorder (PVR) and playback system, an information appliance, and as any number of similar embodiments. For example, a client device 108(1) receives broadcast content from a satellite-based transmitter via a satellite dish 126 . . . Client device 108(1) is a satellite receiving device coupled to a television 128(1) for presenting the content received by the client device (e.g., audio data and video data), as well as a graphical user interface. A particular client device 108 can be coupled to any number of televisions 128 and/or similar devices that can be implemented to display or otherwise render content. Similarly, any number of client devices 108 can be coupled to a single television 128.

Client device 108(2) is also coupled to receive broadcast content from broadcast network 110 and provide the received content to associated television 128(2). Client device 108(N) is an example of a combination television 130 and integrated set-top box or satellite receiver 132. In this example, the various components and functionality of the set-top box are incorporated into the television, rather than using two separate devices. The set-top box incorporated into the television may receive broadcast signals via a satellite dish (similar to satellite dish 126) and/or via broadcast network 110. In alternate implementations, client devices 108 may receive broadcast signals via the Internet or any other broadcast medium.

The exemplary system 100 also includes stored on-demand content 134, such as Video On-Demand (VOD) movie content. The stored on-demand content can be viewed with a television 128 via a client device 108 through an onscreen movie guide, for example, and a viewer can enter instructions to stream a particular movie, or other stored content, to a corresponding client device 108.

Figure 2:
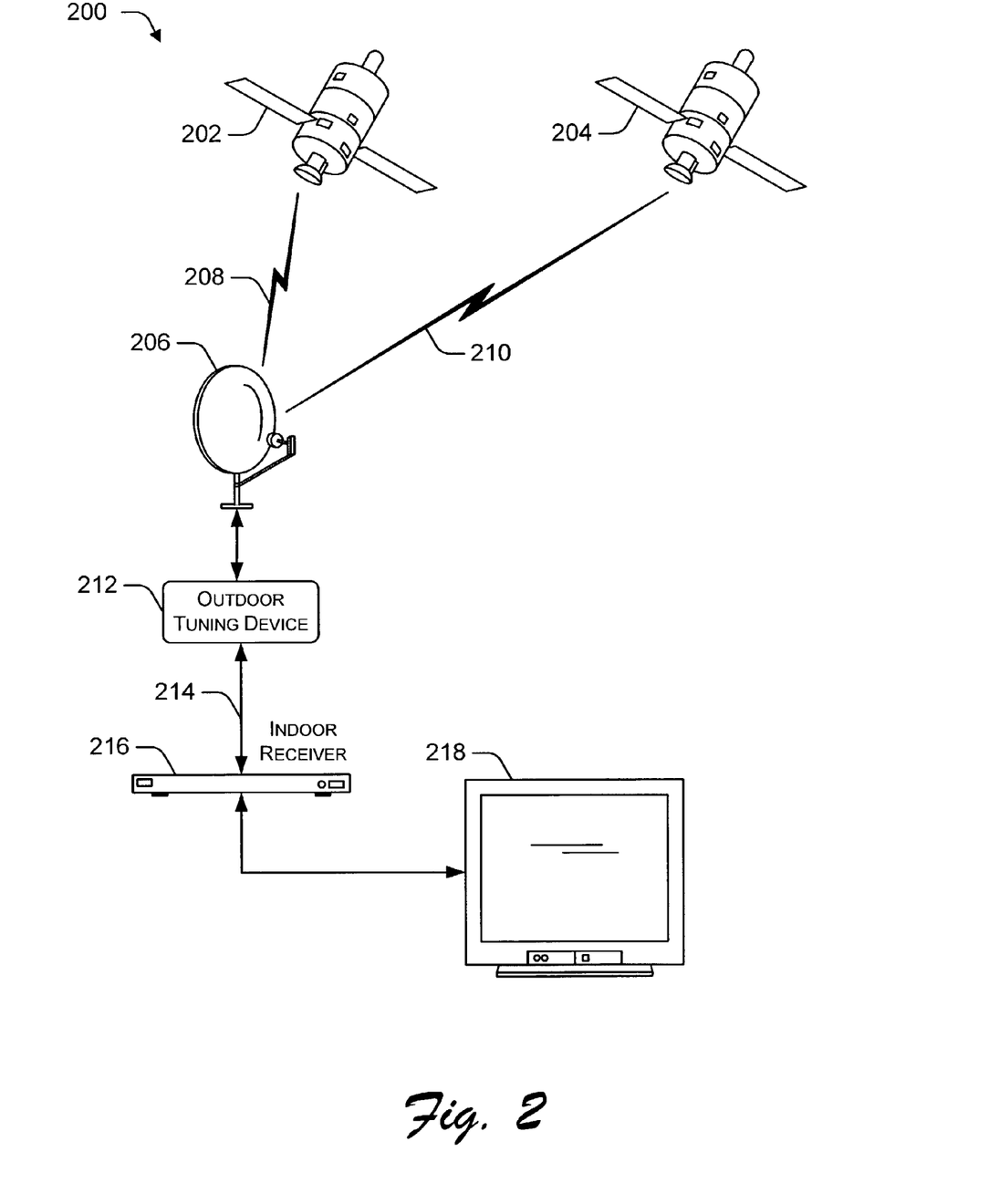
FIG. 2 illustrates an example environment in which multiple satellite signals are received and processed by an outdoor tuning device and an indoor receiver.

FIG. 2 illustrates an example environment 200 in which multiple satellite signals are received and processed by an outdoor tuning device and an indoor receiver. Environment 200 includes two satellites 202 and 204, each of which transmit signals to a receiving antenna 206. The signals transmitted by satellites 202 and 204 are identified by reference numerals 208 and 210, respectively. In a particular embodiment, signals 208 and 210 are transmitted in one direction; i.e., from the corresponding satellite 202 and 204 to antenna 206. In alternate embodiments, antenna 206 includes a transmitter capable of transmitting signals from antenna 206 to satellite 202 and/or satellite 204. Although environment 200 shows two satellites 202 and 204 transmitting signals to antenna 206, alternate environments may include any number of satellites transmitting signals to any number of antennas.

Antenna 206 receives the signals 208 and 210 and communicates those signals to an outdoor tuning device 212 which is coupled to antenna 206. The outdoor tuning device 212 is typically located near the antenna 206. Each received signal 208 and 210 contains one or more different frequency bands which are signal components, or transponders. In a particular embodiment, each frequency band is associated with a specific television broadcast channel, radio broadcast channel, or other broadcast channel. The outdoor tuning device 212 processes the two received signals 208 and 210 and communicates the two received signals across a single communication link 214 to indoor receiver 216. Rather than sending each received signal 208 and 210 on separate communication links to the indoor receiver 216, the outdoor tuning device 212 combines the two received signals 208 and 210 for communication across the single communication link 214.

Indoor receiver 216 receives the data communicated from outdoor tuning device 212 and processes the received data, for example, to be displayed on a television 218 or other display device. Indoor receiver 216 represents one example of a client device 108 shown in FIG. 1. Indoor receiver 216 is typically located inside a house or other structure and is typically located near the television 218 or other display device. Communication link 214 is a bidirectional communication link that allows the indoor receiver 216 to send commands and other information to the outdoor tuning device 212. Additional details regarding indoor receiver 216 are provided below with respect to FIG. 4. Although a single television 218 is shown in FIG. 2, alternate environments 200 may include any number of televisions or other display devices coupled to the indoor receiver 216.

Figure 3:
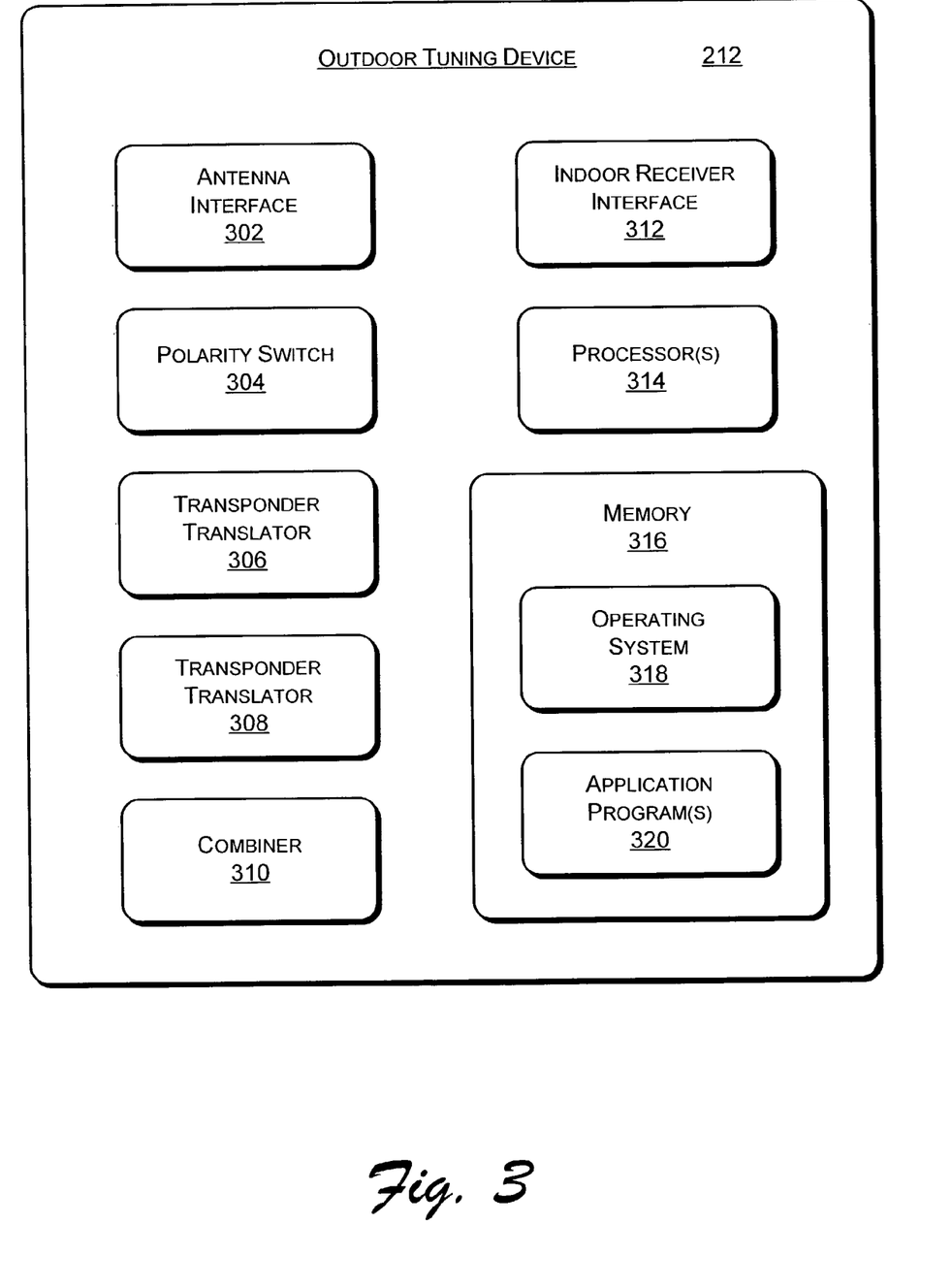
FIG. 3 is a block diagram that illustrates components of an example outdoor tuning device.

FIG. 3 is a block diagram that illustrates components of the example outdoor tuning device 212 shown in FIG. 2. Outdoor tuning device 212 includes an antenna interface 302, a polarity switch 304, a pair of transponder translators 306 and 308, a combiner 310, and an indoor receiver interface 312. The antenna interface 302 receives signals from an external antenna (one signal from each LNBF), such as antenna 206 shown in FIG. 2. Polarity switch 304 includes one input for each polarity of every satellite. Polarity switch 304 also includes an output for each tuner. In the example with four LNBFs, polarity switch 304 has eight inputs (four satellites multiplied by two polarities) and four outputs (one for each of the four tuners).

FIG. 3 illustrates two transponder translators 306 and 308. The number of transponder translators in a particular outdoor tuning device corresponds to the number of tuners. If a particular system includes four tuners, then the outdoor tuning device will include four transponder translators. Each transponder translator 306 and 308 "moves" a transponder from its original frequency band to one of multiple predetermined bands for transmission across the single communication link 214 between the outdoor tuning device 212 and the indoor receiver 216 (FIG. 2).

Combiner 310 combines the transponders from the transponder translators 306 and 308 effectively creating a new "polarity" to be received by the indoor receiver. Indoor receiver interface 312 transmits the combined signal from combiner 310 to the indoor receiver 216. Indoor receiver interface 312 receives signals, such as control signals, from the indoor receiver.

Outdoor tuning device 212 also includes one or more processors 314 and a memory 316, which contains, for example, an operating system 318 and one or more application programs 320. A processor 314 receives commands from the indoor receiver 216 to control the polarity switch 304 and the transponder translators 306 and 308. The processor 314 also executes application programs 320, such as an application program that adjusts received signal strengths based on one or more control signals received from the indoor receiver.

Figure 4:
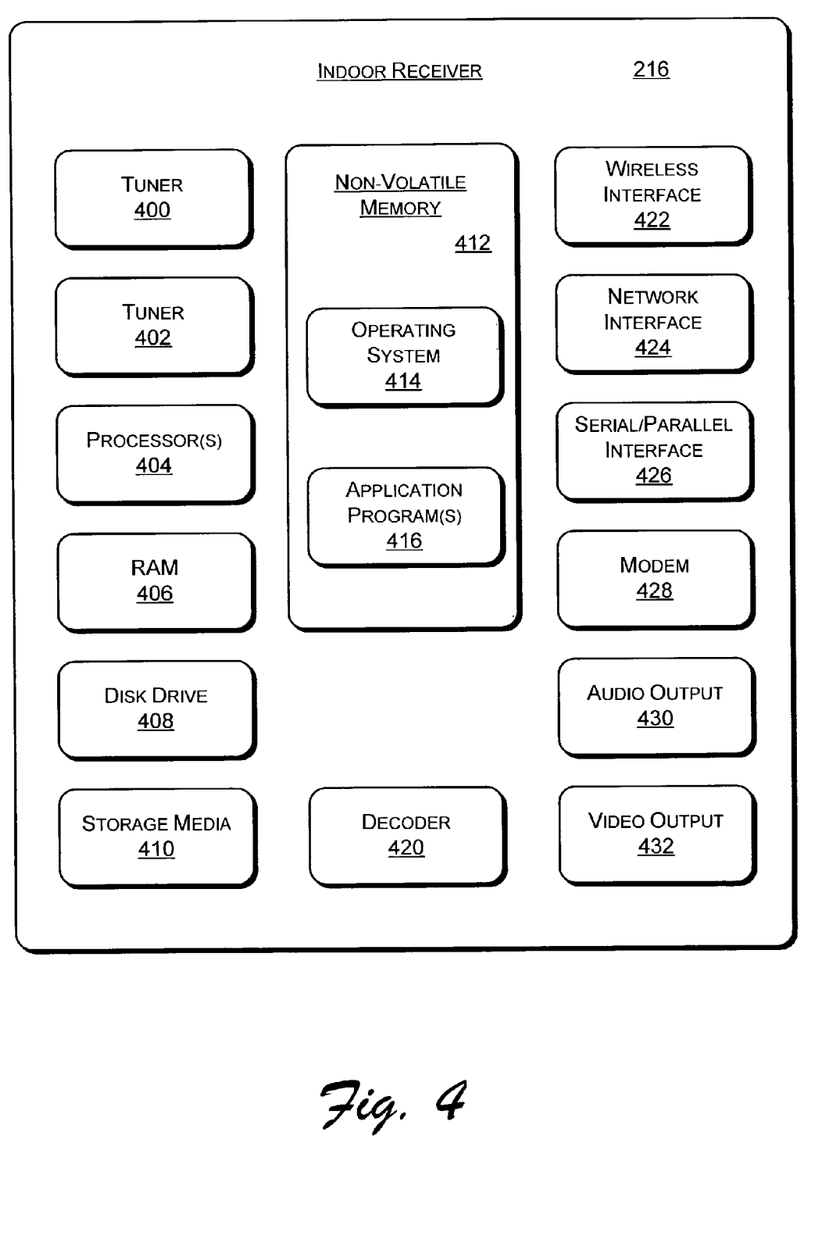
FIG. 4 is a block diagram illustrating components of an exemplary indoor receiver.

FIG. 4 is a block diagram illustrating components of exemplary indoor receiver 216. Indoor receiver 216 includes a first tuner 400 and an optional second tuner 402. The tuners 400 and 402 are representative of one or more in-band tuners that tune to various frequencies or channels to receive television signals, radio signals, and/or other signals.

Indoor receiver 216 also includes one or more processors 404 and one or more memory components. Examples of possible memory components include a random access memory (RAM) 406, a disk drive 408, a mass storage media 410, and a non-volatile memory 412 (e.g., ROM, Flash, EPROM, EEPROM, etc.). Alternative implementations of indoor receiver 216 can include a range of processing and memory capabilities, and may include any number and different memory components than those illustrated in FIG. 4. For example, full-resource receivers can be implemented with substantial memory and processing resources, including the disk drive 408. Low-resource receivers, however, may have limited processing and memory capabilities, such as a limited amount of RAM 406 and limited processing capabilities of a processor 404.

Processor(s) 404 process various instructions to control the operation of indoor receiver 216 and to communicate with other electronic and computing devices. The memory components (e.g., RAM 406, disk drive 408, storage media 410, and non-volatile memory 412) store various information and/or data such as content, configuration information for indoor receiver 216, and/or graphical user interface information.

An operating system 414 and one or more application programs 416 may be stored in non-volatile memory 412 and executed on a processor 404 to provide a runtime environment. A runtime environment facilitates extensibility of indoor receiver 216 by allowing various interfaces to be defined that, in turn, allow application programs 416 to interact with indoor receiver 216. The application programs 416 that may be implemented in indoor receiver 216 can include a browser to browse the Web (e.g., "World Wide Web"), an email program to facilitate electronic mail, an electronic program guide, and so on.

Indoor receiver 216 also includes a decoder 420 to process and decode broadcast video signals, such as an NTSC, PAL, SECAM, or other television system analog video signals, as well as a DVB, ATSC, or other television system digital video signals. Additionally, decoder 420 may decode encoded signals such as MPEG-2 or MPEG-4 (Moving Picture Experts Group) encoded video content. Indoor receiver 216 further includes a wireless interface 422, a network interface 424, a serial and/or parallel interface 426, and a PSTN, DSL, or cable modem 428. Wireless interface 422 allows indoor receiver 216 to receive input commands and other information from a user-operated input device, such as from a remote control device or from another IR, Bluetooth, 802.11, or similar wireless and/or RF input device.

Network interface 424 and serial and/or parallel interface 426 enables indoor receiver 216 to interact and communicate with other electronic and computing devices via various communication links. Although not shown, indoor receiver 216 may also include other types of data communication interfaces to communicate with other devices. Modem 428 facilitates indoor receiver 216 communication with other electronic and computing devices via a conventional telephone line, a DSL connection, or a cable modem.

Indoor receiver 216 also includes an audio output 430 and a video output 432 that provide signals to a television or other device that processes or otherwise renders audio and video data. Although shown separately, some of the components of indoor receiver 216 may be implemented in an application specific integrated circuit (ASIC). Additionally, a system bus (not shown) typically connects the various components within indoor receiver 216. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Figure 5:
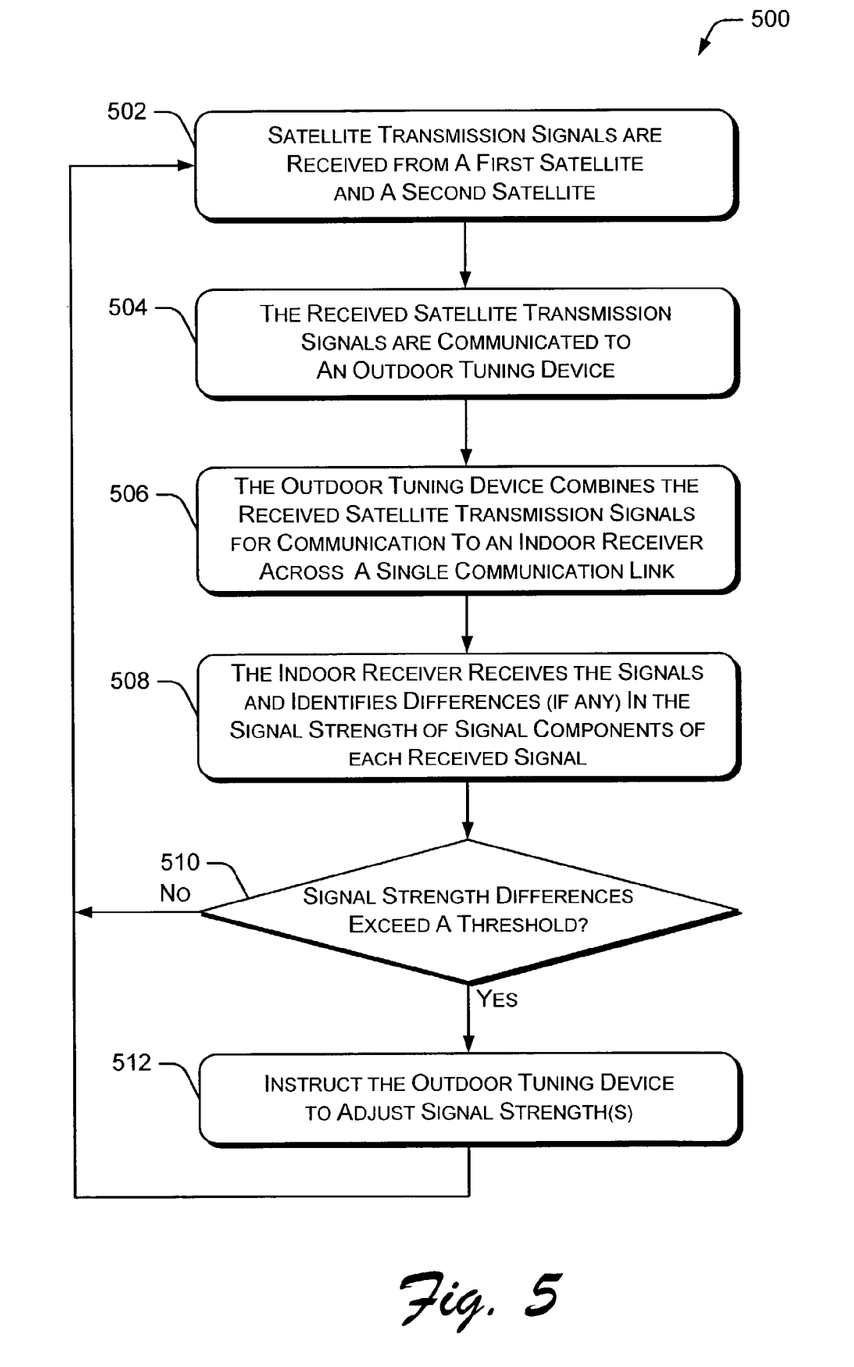
FIG. 5 illustrates a flow diagram of a procedure for processing signals received from multiple satellites.

FIG. 5 illustrates a flow diagram of a procedure 500 for processing signals received from multiple satellites. Initially, satellite transmission signals are received from a first satellite and a second satellite (block 502). The received satellite transmission signals are communicated to an outdoor tuning device (block 504). The outdoor tuning device combines the received satellite transmission signals for communication to an indoor receiver across a single communication link (block 506). The indoor receiver receives the signals and identifies differences, if any, in the signal strength of signal components of each received signal (block 508).

The procedure 500 then determines whether the differences in the strengths of the signals exceeds a threshold (block 510). For example, the strengths of one or more signal components may be compared. If the difference in the strength of the signal components exceeds a threshold value (such as 3 dB (three decibels)), the outdoor tuning device is instructed to adjust the signal strength of one or more of the signal components to reduce the difference in signal strength between the signal components. If the difference in the signal strengths does not exceed the threshold, the procedure returns to block 502 to continue processing and analyzing additional satellite transmission signals.

The differences in signal strengths may result from different obstructions or conditions in the signal paths from the different satellites to the receiving antenna. For example, different satellite signals may pass through different atmospheric conditions that have different effects on the satellite signals, thereby causing a difference in signal strength between the signal components. In another situation, one satellite signal may wholly or partially pass through a tree, telephone pole, or other obstruction that reduces the strength of the signal. This satellite signal may have a lesser signal strength than a signal from a satellite that does not pass through such an obstruction. Additionally, different satellites may transmit signals at different strengths, resulting in received satellite signals having different strengths, and thus satellite signal components having different strengths.

The procedure of FIG. 5 may be executed, for example, when the indoor receiver is activated or reset. Additionally, the procedure of FIG. 5 may be executed at periodic intervals to adjust, if necessary, for ongoing changes in signal strengths due to changes in atmospheric conditions or other factors affecting the received signal strength. In a particular implementation, the indoor receiver communicates signal adjustment instructions to the outdoor tuning device using DiSEqC (Digital Satellite Equipment Control). DiSEqC is an open standard that allows satellite-based devices to communicate with one another.

In another implementation, the indoor receiver communicates signal adjustment instructions to the outdoor tuning device using a tone (such as a 100 kHz tone) that is changed to indicate an adjustment of a particular signal component. For example, a 100 kHz tone indicates no change in the signal strength of a particular signal component. A 90 kHz tone indicates that the signal strength should be reduced by a particular magnitude, such as five decibels (5 dB). A 120 kHz tone indicates that the signal strength should be increased by a particular magnitude, such as ten decibels (10 dB). When adjusting multiple signal component signal strengths, a different frequency range is used for the tones associated with each of the multiple signals. For example, frequencies around 100 kHz are used for a first signal, frequencies around 200 kHz are used for a second signal, and frequencies around 300 kHz are used for a third signal. An analog-to-digital converter (A/D converter) can be used to measure the signal strength of each signal and signal components received by the indoor receiver and/or the outdoor tuning device.

When adjusting the signal strengths of two different signal components, the signal strength of one signal component may be adjusted (amplified or attenuated) or the signal strength of both signal components may be adjusted (amplified or attenuated). Amplifying the signal strength of a signal component corresponds to increasing the signal strength. Attenuating the signal strength of a signal component corresponds to decreasing the signal strength. The decision whether to adjust the strength of one signal component or both signal components may depend on the magnitude of the difference between the two signal strengths. If the difference between the two signal strengths is small, the two strengths may be equalized by adjusting one signal component. However, if the difference between the two signal strengths is large, both signal components may be adjusted (i.e., the stronger signal is attenuated and the weaker signal is amplified).

Figure 6:
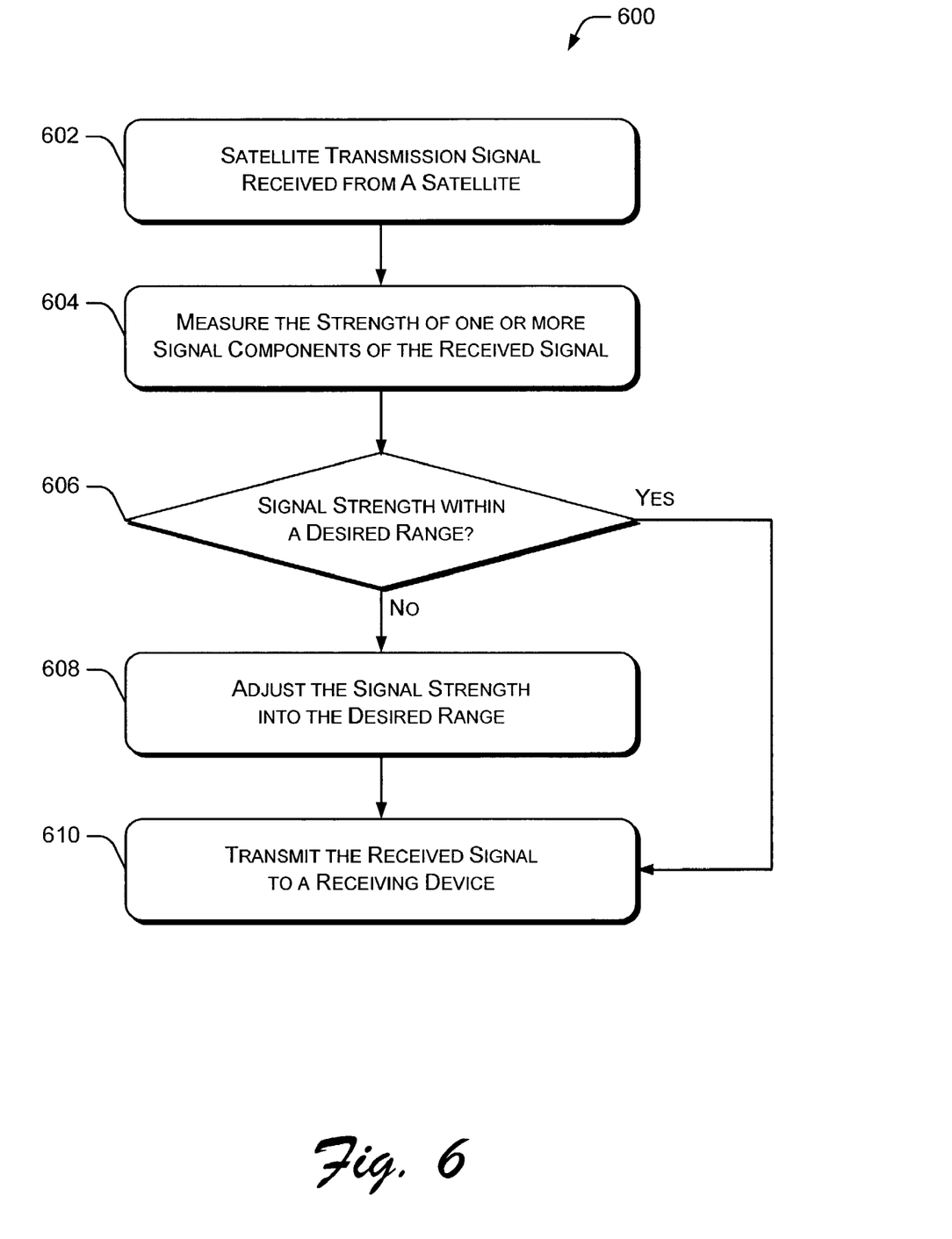
FIG. 6 illustrates a flow diagram of a procedure for processing a signal received from a satellite.

Although particular examples discussed herein describe systems and methods for processing multiple signals, alternate embodiments may process the signal components of one signal. FIG. 6 below illustrates an example of such an alternate embodiment.

FIG. 6 illustrates a flow diagram of a procedure 600 for processing a signal received from a satellite. Initially, a satellite transmission signal is received from a satellite (block 602). The procedure 600 measures the strength of one or more signal components of the received signal (block 604). Next, the procedure determines whether the strength of one or more of the signal components is within a desired range of signal strengths (block 606). The desired range may be determined, for example, based on desired signal strengths for an analog-to-digital converter or other component of the satellite receiving and decoding system. If the strength of a received satellite signal component is not within the desired range, the signal strength is adjusted to bring the signal strength within the desired range (block 608). Once the strength of the received satellite signal component is within the desired range, the procedure transmits the received signal to a receiving device (block 610).

Figure 7:
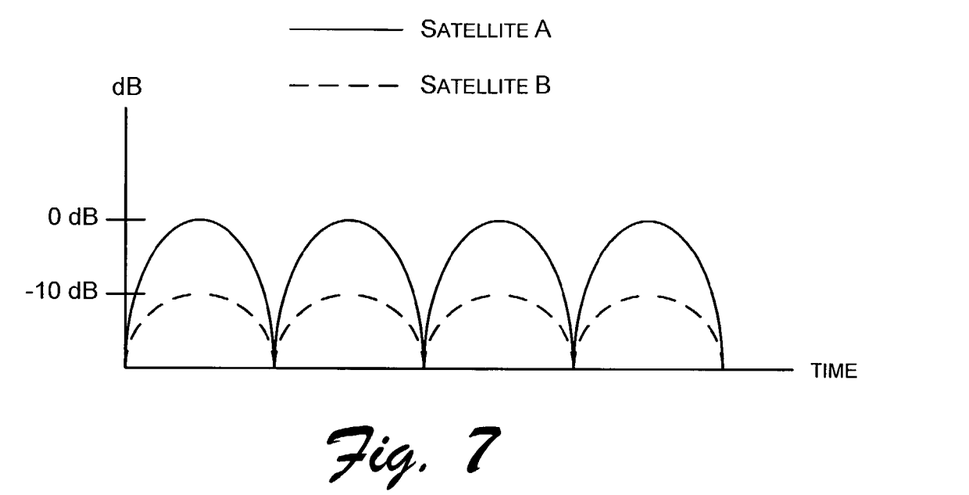
FIG. 7 illustrates example wave forms associated with signal components received from two different satellites, or from a single satellite.

FIG. 7 illustrates example wave forms associated with signal components corresponding to signals received from two different satellites, or signal components of one received satellite signal. The wave form having the solid line represents a signal component received from a first satellite (referred to as "Satellite A"). The wave form having the broken line represents a signal component received from a second satellite (referred to as "Satellite B"). As shown in FIG. 7, the signal component received from Satellite B is ten decibels (10 dB) weaker than the signal received from Satellite A. To reduce the difference in strengths between the signal components from Satellite A and Satellite B, the signal component from Satellite B can be amplified or the signal component from Satellite A can be attenuated. Alternatively, the signal component from Satellite B can be amplified while, at the same time, the signal component from Satellite A is attenuated. This last alternative is shown below with reference to FIGS. 8 and 9.

Figure 8:
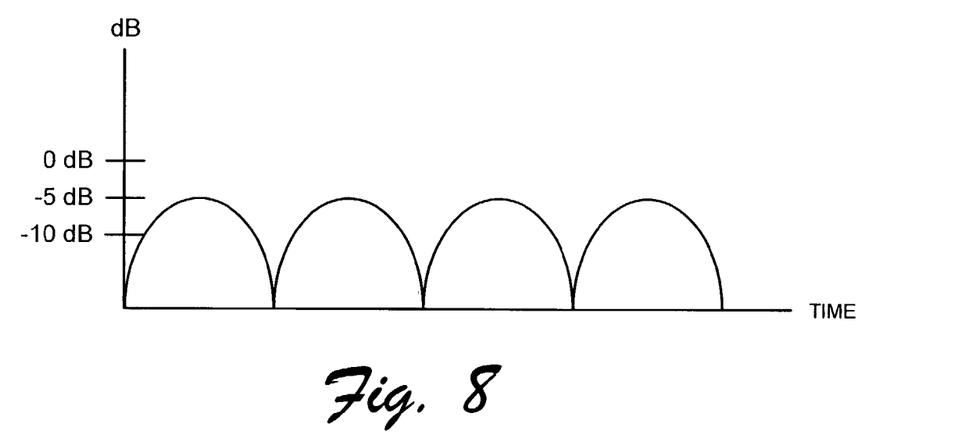
FIGS. 8 and 9 illustrate the wave forms of FIG. 7 after adjusting the strength of the received signal components.
Figure 9:
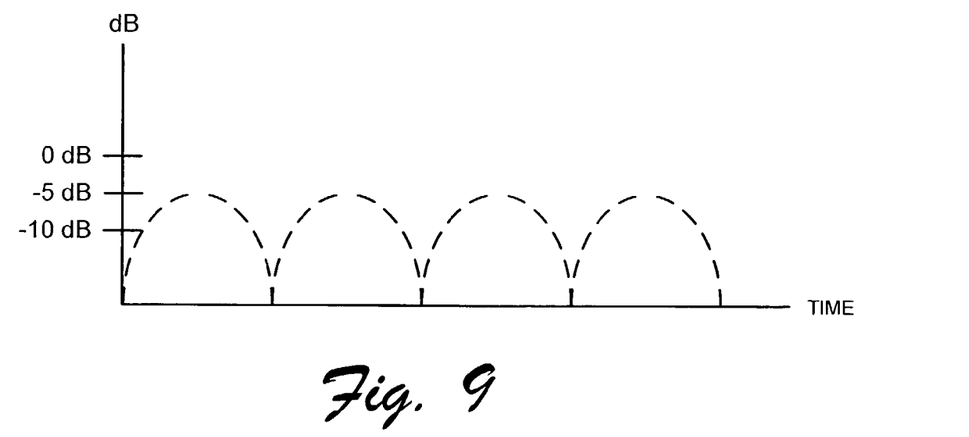

FIGS. 8 and 9 illustrate the wave forms of FIG. 7 after adjusting the strength of the signal components received from the two satellites (or two signal components received as part of one signal from a satellite). Specifically, FIG. 8 illustrates the wave form associated with the signal component received from Satellite A after attenuating the signal component by five decibels (5 dB). FIG. 9 illustrates the wave form associated with the signal component received from Satellite B after amplifying the signal component by five decibels (5 dB). After these adjustments, the resulting signal components have approximately the same strength, thereby substantially eliminating the difference in strength between the signal components received from Satellite A and Satellite B. By reducing the difference in signal strength between the received signal components, the amount of crosstalk or other signal corruption is reduced on the communication link between the outdoor tuning device and the indoor receiver.

Particular systems and methods discussed herein include an indoor receiver that compares the strengths of two or more signal components and communicates any adjustment instructions to an outdoor tuning device. In alternate embodiments, the outdoor tuning device compares the strengths of two or more signal components and makes any necessary adjustments to reduce the difference in the signal strengths. In another alternative embodiment, another device may compare the strengths of two or more signal components and communicate adjustment instructions (if any) to the outdoor tuning device and/or to the indoor tuning device.

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

What is claimed is:

1. A method comprising:
  receiving a first signal component having an associated first signal strength;
  receiving at least a second signal component having an associated second signal stretch;
  identifying a difference between the first signal strength and the second signal strength;
  determining whether the difference between the first signal strength and the second signal strength exceeds a threshold; and
  if the difference between the first signal strength and the second signal strength exceeds the threshold, adjusting the first signal strength to reduce the difference between the first signal strength and the second signal strength before combining the first and second signal components for transmission across a common communication link.

2. A method as recited in claim 1 further comprising receiving a signal from a satellite, the signal including the first signal component and the second signal component.

3. A method as recited in claim 1 further comprising receiving a first signal from a satellite and receiving a second signal from the satellite, the first signal including the first signal component and the second signal including the second signal component.

4. A method as recited in claim 1 wherein the first signal component is received from a first satellite and the second signal component is received from a second satellite.

5. A method as recited in claim 1 wherein the first signal component is received as a transducer of left-hand polarity and the second signal component is received as a transducer of right-hand polarity.

6. A method as recited in claim 1 further comprising receiving a signal from a satellite, the signal including the first signal component and the second signal component, and wherein the first signal component is a transducer of left-hand polarity and the second signal component is a transducer of right-hand polarity.

7. A method as recited in claim 1 further comprising receiving a signal from a satellite, the signal including the first signal component and the second signal component, and wherein the first signal component is a transducer of a particular polarity and the second signal component is a transducer of the particular polarity.

8. A method as recited in claim 1 wherein the first signal component is received from a first satellite as a transducer of left-hand polarity, and wherein the second signal component is received from a second satellite as a transducer of right-hand polarity.

9. A method as recited in claim 1 wherein the first signal component is received from a first satellite as a transducer of a particular polarity, and wherein the second signal component is received from a second satellite as a transducer of the particular polarity.

10. A method as recited in claim 1 wherein adjusting the first signal strength includes attenuating the first signal strength in an amount corresponding to a given frequency of an instruction signal.

11. A method as recited in claim 1 wherein adjusting the first signal strength includes amplifying the first signal strength in an amount corresponding to a given frequency of an instruction signal.

12. A method as recited in claim 1 further comprising adjusting the second signal strength to reduce the difference between the first signal strength and the second signal strength if the difference between the first signal strength and the second signal strength exceeds the threshold.

13. A method as recited in claim 12 wherein adjusting the first signal strength includes attenuating the first signal strength, and wherein adjusting the second signal strength includes amplifying the second signal strength.

14. A method as recited in claim 12 wherein adjusting the first signal strength includes amplifying the first signal strength, and wherein adjusting the second signal strength includes attenuating the second signal strength.

15. One or more computer-readable media comprising computer-executable instructions that, when executed, direct a computing system to perform the method of claim 1.

16. One or more computer-readable media comprising computer-executable instructions that, when executed, direct a satellite signal processing system to perform the method of claim 1.

17. A method comprising:
receiving a first signal component from a first satellite, the first signal component having an associated first signal strength;
receiving at least a second signal component from a second satellite, the second signal component having an associated second signal strength;
communicating the first signal component and the second signal component to a receiving device;
receiving an instruction from the receiving device to adjust the first signal strength before combining the first and second signal components for transmission across a common communication link wherein the instruction to adjust the first signal strength includes a magnitude of the adjustment based on a difference between the first signal strength and the second signal strength; and
adjusting the first signal strength based on the received instruction.

18. A method as recited in claim 17 wherein adjusting the first signal strength includes attenuating the first signal strength.

19. A method as recited in claim 17 wherein adjusting the first signal strength includes amplifying the first signal strength.

20. A method as recited in claim 17 wherein the instruction to adjust the first signal strength is received as a generated tone.

21. A method as recited in claim 17 wherein the first signal component is received as a transducer of a particular polarity, and wherein the second signal component is received as a transducer of the particular polarity.

22. A method as recited in claim 17 wherein the first signal component is received as a transducer of a left-hand polarity, and wherein the second signal component is received as a transducer of a right-hand polarity.

23. A method as recited in claim 17 further comprising:
receiving an instruction from the receiving device to adjust the second signal strength, wherein the instruction to adjust the second signal strength includes a magnitude of the adjustment based on the difference between the first signal strength and the second signal strength; and
adjusting the second signal strength based on the received instruction.

24. A method as recited in claim 23 wherein adjusting the first signal strength includes amplifying the first signal strength, and wherein adjusting the second signal strength includes attenuating the second signal strength.

25. A method as recited in claim 23 wherein adjusting the first signal strength includes attenuating the first signal strength, and wherein adjusting the second signal strength includes amplifying the second signal strength.

26. One or more computer-readable media comprising computer-executable instructions that, when executed, direct a computing system to perform the method of claim 17.

27. One or more computer-readable media comprising computer-executable instructions that, when executed, direct a satellite signal processing system to perform the method of claim 17.

28. An apparatus comprising:
a memory;
a processor coupled to the memory; and
an application program stored in the memory and executed by the processor, the application program configured to analyze signal strengths of a plurality of received satellite signal components, wherein the application program determines a difference between the signal strengths of the received satellite signal components and generates an instruction to adjust at least one signal strength before combining the signal components for transmission across a common communication link, if the difference between the signal strengths exceeds a threshold.

29. An apparatus as recited in claim 28 wherein the instruction to adjust at least one signal strength includes attenuating at least one signal strength.

30. An apparatus as recited in claim 28 wherein the instruction to adjust at least one signal strength includes amplifying at least one signal strength.

31. An apparatus as recited in claim 28 wherein the instruction to adjust at least one signal strength includes attenuating a first signal strength and amplifying a second signal strength.

32. An apparatus as recited in claim 28 wherein the instruction to adjust at least one signal strength includes attenuating at least a first signal strength and amplifying at least a second signal strength.

33. An apparatus comprising:
means for receiving a plurality of signal components;
means far analyzing received signal strengths of the signal components and determining whether differences in received signal strengths exceed a threshold; and
means for adjusting a signal strength associated with a particular received signal component before combining the first and second signal components for transmission across a common communication link, if differences in received signal strengths exceed the threshold.

34. An apparatus as recited in claim 33 wherein the means for receiving a plurality of signals is a satellite antenna.

35. An apparatus as recited in claim 33 wherein the means for analyzing received signal strengths is an indoor receiver.

36. An apparatus as recited in claim 33 wherein the means for adjusting a signal strength is an outdoor tuning device.

37. An apparatus as recited in claim 33 wherein the means for analyzing received signal strengths is an analog-to-digital converter.

38. An apparatus as recited in claim 33 wherein the means for adjusting a signal strength is an automatic gain control device.

39. One or more computer-readable media comprising computer executable instructions that, when executed, direct a computing device to:

receive a first signal from a first satellite, the first signal including a first signal component having an associated first signal strength;

receive a second signal from a second satellite, the second signal including a second signal component having an associated second signal strength;

communicate the first signal component and the second signal component to a receiving device;

receive an instruction from the receiving device to adjust the first signal strength before combining the first and second signal components for transmission across a common communication link, wherein the instruction to adjust the first signal strength includes a magnitude of the adjustment which is based on a difference between the first signal strength and the second signal strength; and adjust the first signal strength based on the received instruction.

40. One or more computer-readable media as recited in claim 39 wherein the received instruction indicates that the first signal strength should be attenuated.

41. One or more computer-readable media as recited in claim 39 wherein the received instruction indicates that the first signal strength should be amplified.

* * * * *

UNITED STATES PATENT AND TRADEMARK OFFICE
CERTIFICATE OF CORRECTION

PATENT NO. : 7,072,627 B2
APPLICATION NO. : 10/184819
DATED : July 4, 2006
INVENTOR(S) : Coffin, III It is certified that error appears in the above-identified patent and that said Letters Patent is hereby corrected as shown below:

On the Title page, in field (56), under "Other Publications", in column 2, line 11, delete "Vehiclular" and insert -- Vehicular --, therefor.

In column 4, line 42, delete "126 ..." and insert -- 126. --, therefor.

In column 10, line 9, in Claim 1, delete "stretch;" and insert -- strength; --, therefor.

In column 11, line 34, in Claim 17, after "link" insert -- , --.

In column 12, line 45, in Claim 33, delete "far" and insert -- for --, therefor.

Signed and Sealed this

Thirtieth Day of March, 2010

David J. Kappos
*Director of the United States Patent and Trademark Office*